Jan. 3, 1956  W. F. BUTLER  2,729,212
DRIP METER
Filed Oct. 6, 1951

INVENTOR.
WILLIAM F. BUTLER
BY
Mellin and Hanscom
ATTORNEYS

United States Patent Office 2,729,212
Patented Jan. 3, 1956

2,729,212

DRIP METER

William F. Butler, Oakland, Calif., assignor to Cutter Laboratories, Berkeley, Calif., a corporation of California Application October 6, 1951, Serial No. 250,087

4 Claims. (Cl. 128—214)

This invention relates to and in general has for its object the provision of a drip for use in dispensing massive parenteral solutions and in which the entrainment of air is essentially eliminated.

In setting up bottles of solutions for making intravenous injections it is necessary to include a drip meter in the system and to make certain that the connecting tubing is filled with solution and contains no entrained air.

More specifically, this invention has for its object the provision of a drip meter including a transparent cylindrical chamber or shell provided at its lower end with an upstanding solution outlet nipple and wherein a resilient bonnet or cap of elliptical cross-section is frictionally mounted on the upper end of said nipple, thereby to provide a tortuous path for the flow of solution between said bonnet or cap and said nipple, and hence downwardly through said nipple.

The invention possesses other advantageous features, some of which, with the foregoing, will be set forth at length in the following description where that form of the invention which has been selected for illustration in the drawings accompanying and forming a part of the specification is outlined in full.

In said drawings, one form of the invention is shown, but it is to be understood that it is not limited to such form, since the invention as set forth in the claims may be embodied in other forms.

Referring to the drawings.

Figure 1:
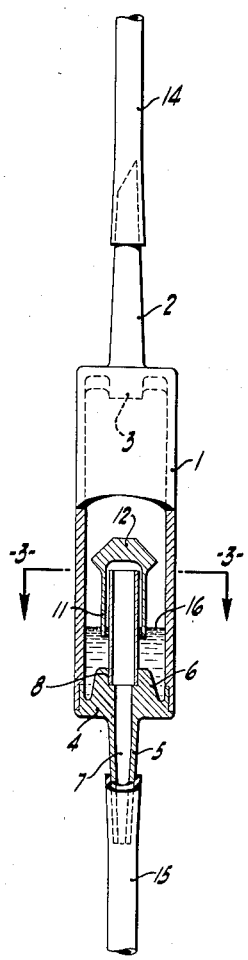
Figure 1 is a side elevation of a drip meter embodying the objects of my invention and wherein the lower half thereof is shown in mid-section, the better to illustrate its construction.
Figure 2:
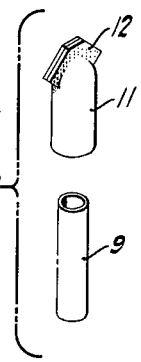
Figure 2 is an exploded view of the upstanding solution outlet nipple of my drip meter and its associated bonnet.

The drip meter as illustrated in these figures includes a transparent, cylindrical drip meter chamber or shell 1 provided at its upper end with an upstanding inlet stem 2 terminating at its lower end in a drip nipple 3.

Sealed to the lower end of the chamber or shell 1 is a cap 4 provided with a downwardly extending stem 5 and with an upwardly extending boss 6, these members being provided with a central passageway 7 and a counterbore 8.

Figure 3:
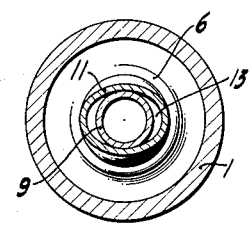
Figure 3 is a horizontal section taken on the section line 3—3 of Figure 1.

Sealed within the counter-bore 8 is a relatively rigid upstanding solution outlet nipple 9 and mounted on the upper end of this nipple is a bonnet 11 made of relatively thin pliant plastic tubing. The upper end of the bonnet 11 is sealed by pinching a pair of its diametrically opposed sides together under the influence of heat as at 12. As a result of sealing the upper end of the bonnet in this manner its body is deformed so as to assume an elliptical cross-section as best shown in Figure 3. The normal diameter of the tubing from which the bonnet 11 is made should be so correlated with the diameter of its associated nipple 9 that the sides of the bonnet at the minor axis thereof frictionally engages diametrically opposed walls of the nipple and that its sides adjacent its major axis are spaced from the nipple and define therewith, passage ways 13, all as shown in Figures 1 and 3.

The drip meter as above described is arranged to be connected through its stem 2 and a section of tubing 14 with a suitable source of the solution to be administered. The lower drip meter stem 5 is designed to be connected through tubing 15 with an injection needle through which the solution is to be administered to a patient.

Preparatory to making an injection, the solution is allowed to pass into the meter and in so doing the level thereof within the chamber 1 rises to the point 16 about 1/16" above the lower end of the bonnet 11. Thereafter the solution level within the chamber or shell 1 remains fixed although solution passes upwardly through the passageways 13 and overflows into the outlet nipple 9 and hence downwardly until it has completely filled the remainder of the system. In so doing the solution displaces all air within the nipple 9, the passageway 7 and the tubing 15. The system is then ready for effecting an administration of solution which can be done without the entrainment of air as it passes through the meter.

It will therefore be seen that I have provided a drip meter which can be easily cleared of air preparatory to use, which can be effectively used without danger of the entrainment of air in the solution passing through it, and which due to its extreme simplicity of construction can be made and sold at a sufficiently low price to justify discarding it once it has been used.

Having thus described my invention, what I claim and desire to secure by Letters Patent is:

1. A drip meter for intravenous solution sets comprising: a transparent tubular drip meter shell provided at its lower end with an outlet passageway and at its upper end with an inlet nipple arranged to be connected with a suitable source of transfusion fluid; an upstanding nipple mounted within said shell with its lower end in communication with said outlet passageway; a bonnet mounted over said upstanding nipple, one pair of opposed side walls of said bonnet being in engagement with the sides of said upstanding nipple.

2. A drip meter for intravenous solution sets comprising: a transparent cylindrical drip meter shell provided at its lower end with an outlet passageway and at its upper end with an inlet arranged to be connected with a suitable source of transfusion fluid; an upstanding nipple mounted within said shell with its lower end in communication with said outlet passageway; a pliant bonnet mounted over said nipple, the side walls of said bonnet being of elliptical cross-section with walls thereof adjacent its minor axis in frictional engagement with diametrically opposed sides of said nipple.

3. A drip meter for intravenous solution sets comprising: a transparent tubular drip meter shell provided at its lower end with an outlet passageway and at its upper end with an inlet arranged to be connected with a suitable source of transfusion fluid; an upstanding nipple mounted within said shell with its lower end in communication with said outlet passageway; a pliant tubular member mounted over said nipple, the upper end of said member being pinched together and sealed; portions of the walls of said member being in slight frictional engagement with the walls of said nipple and other portions of the walls of said member being positively spaced from said nipple so as to form fluid channels therewith.

4. A drip meter for intravenous solution sets comprising: a transparent tubular drip meter shell provided at its lower end with an outlet passageway and at its upper end with an inlet nipple arranged to be connected with a suitable source of transfusion fluid; an upstanding nipple mounted within said shell with its lower end in communication with said outlet passageway; a bonnet mounted over said nipple, one pair of opposed side walls of said bonnet being in resilient engagement with the sides of said nipple, the upper end of said shell being formed with a depending drip nipple.

References Cited in the file of this patent

UNITED STATES PATENTS

| | | |
|---|---|---|
| 1,834,381 | Caps | Dec. 1, 1931 |
| 2,146,256 | Gobel | Feb. 7, 1939 |
| 2,210,480 | Brice | Aug. 6, 1940 |
| 2,388,432 | Nelson | Nov. 6, 1945 |
| 2,575,574 | Withrow | Nov. 20, 1951 |
| 2,592,848 | Baird | Apr. 15, 1952 |
| 2,675,000 | Ford | Apr. 13, 1954 |